United States Patent
Reisacher et al.

(10) Patent No.: US 9,011,595 B2
(45) Date of Patent: Apr. 21, 2015

(54) PRODUCING A SOLID PIGMENT PREPARATION IN THE FORM OF GRANULES BY SPRAY DRYING

(75) Inventors: Hans Ulrich Reisacher, Maxdorf (DE); Uwe Mauthe, Mannheim (DE)

(73) Assignee: BASF SE, Ludwigshafen (DE)

( * ) Notice: Subject to any disclaimer, the term of this patent is extended or adjusted under 35 U.S.C. 154(b) by 428 days.

(21) Appl. No.: 12/747,193

(22) PCT Filed: Dec. 9, 2008

(86) PCT No.: PCT/EP2008/067115
§ 371 (c)(1),
(2), (4) Date: Jun. 10, 2010

(87) PCT Pub. No.: WO2009/074576
PCT Pub. Date: Jun. 18, 2009

(65) Prior Publication Data
US 2010/0258034 A1  Oct. 14, 2010

(30) Foreign Application Priority Data

Dec. 10, 2007  (EP) .................................. 07122743

(51) Int. Cl.
*C08K 5/00* (2006.01)
*C09B 67/42* (2006.01)
*B01J 2/04* (2006.01)
*B01J 2/30* (2006.01)
*C09B 67/06* (2006.01)

(52) U.S. Cl.
CPC .............. *C09B 67/0095* (2013.01); *B01J 2/04* (2013.01); *B01J 2/30* (2013.01); *C09B 67/0003* (2013.01)

(58) Field of Classification Search
CPC ........... B01J 2/04; B01J 2/30; C09B 67/0003; C09B 67/0095
USPC ................................................... 106/499, 493
See application file for complete search history.

(56) References Cited

U.S. PATENT DOCUMENTS

| 3,533,776 | A | 10/1970 | Coates et al. |
| 2002/0040665 | A1* | 4/2002 | Dietz et al. ..................... 106/494 |
| 2004/0143040 | A1 | 7/2004 | Metz et al. |
| 2008/0066649 | A1* | 3/2008 | Reisacher et al. ............ 106/401 |
| 2008/0190319 | A1 | 8/2008 | Reisacher et al. |

FOREIGN PATENT DOCUMENTS

| DE | 1 542 149 | 9/1970 |
| DE | 10 2005 035 253 | 2/2007 |
| EP | 1 388 365 | 2/2004 |
| EP | 1 816 171 | 8/2007 |
| FR | 2 899 495 | 10/2007 |
| WO | 02 090446 | 11/2002 |
| WO | 2006 084849 | 8/2006 |

* cited by examiner

*Primary Examiner* — Shuangyi Abu Ali
(74) *Attorney, Agent, or Firm* — Oblon, McClelland, Maier & Neustadt, L.L.P.

(57) ABSTRACT

A process for producing a solid pigment preparation in the form of granules which comprises atomizing a suspension comprising (A0) 30% to 90% of a solvent component, (A1) 2% to 60% of a pigment component; (A2) 0% to 50% of a first filler component, and (A3) 10% to 70% of a surface-active additive component based on the sum of the components (A1) and (A2); contacting formed droplets with a gas stream having a predetermined temperature to dry the droplets to obtain granules having a predetermined residual moisture content, the droplets are exposed to an aerosol comprising a solid second filler component; and separating the granules from the gas st

PRODUCING A SOLID PIGMENT PREPARATION IN THE FORM OF GRANULES BY SPRAY DRYING

The present invention relates to a process for producing a solid pigment preparation in the form of granules and also to granules obtainable from such a process.

Solid pigment preparations, in particular in granule form, that are dispersible in liquid application media simply by stirring or shaking (and hence are known as stir-in pigments) are gathering increasing interest owing to their greater ease of handling compared with liquid pigment preparations. Such ease of handling is very advantageous for direct coloration of inks, paints and coatings.

The production of granules is known in the prior art. In principle, granules are obtainable by granulation of larger particles or by agglomeration of smaller particles.

Typically, pigment granules are obtained by agglomeration from appropriate suspensions which are subject to a spray-drying process.

In the spray-drying process, the suspension, which besides the pigment component further comprises fillers and additives as well as a solvent component, is atomized in an atomizing apparatus, such as a spray tower, so as to produce small droplets which are dried in a hot gas stream—typically an air stream—and the granules are typically obtained by means of collectors, filters or cyclones.

The spray-drying process is established in the prior art, and it is a routine matter for a person skilled in the art to optimize the spray-drying operation so as to produce granules in the desired size and with the desired residual moisture content.

Notwithstanding the prior art spray-drying processes for obtaining pigment granules there is a need for further optimized processes.

It is an object of the present invention to provide such processes.

The purpose of such processes is to obtain granules which differ in their properties from conventional granules.

It is accordingly a further object to provide improved granules.

We have found that these objects are achieved by a process for producing a solid pigment preparation in the form of granules which comprises the steps of
(a) atomizing a suspension comprising
  (A0) 30% to 90% by weight of a solvent component based on the overall weight of the suspension;
  (A1) 2% to 60% by weight of a pigment component based on the overall weight of the suspension;
  (A2) 0% to 50% by weight of a first filler component based on the overall weight of the suspension,
  (A3) 10% to 70% by weight of a surface-active additive component based on the sum total of the weights of said components (A1) and (A2), and optionally further components,
the sum total of the weight fractions of all components based on the overall weight, being 100% by weight,
  in an atomizing apparatus;
(b) contacting the droplets formed in step (a) with a gas stream having a predetermined temperature to dry the droplets to obtain granules having a predetermined residual moisture content, and
(c) separating the granules from the gas stream,
wherein, in step (b), before reaching the residual moisture content, the droplets are at least partly exposed to an aerosol comprising a solid second filler component.

We have found that the objects are also achieved by a solid pigment preparation in the form of granules which is obtainable by following the process of the present invention.

It has been determined that treating the drops of liquid obtained in the atomizing apparatus with an aerosol comprising a solid second filler component provides granules which can have a lower fraction of such a second filler component to obtain granules having excellent flowing and metering properties for dosing as a solid. Granules without a second filler component are very prone to sticking or caking due to the liquid or low-melting surface-active additives, and because they do not flow freely are not readily metered or dosed.

The first step of the present invention's process for producing a solid pigment preparation in the form of granules comprises atomizing a suspension in an atomizing apparatus.

The atomizing apparatus comprises for example a spray tower. The atomizing operation as such is effected by following prior art processes for spray drying.

The atomizing of the suspension is effected for example with the aid of a nozzle and/or rotating atomizer disks.

The suspension used comprises, based on the overall weight of the suspension, (A0) 30% to 90% by weight of a solvent component.

The proportion of solvent component in the suspension is preferably in the range from 40 to 70% by weight.

The solvent component can consist of one or more solvents which are preferably at least partly miscible.

Preferred solvents are water, alcohols and glycols, such as ethylene glycol, propylene glycol, diethylene glycol, higher glycols and mixtures thereof. Water is preferred.

The suspension in step (a) of the present invention's process for producing a solid pigment preparation in the form of granules further comprises (A1) 2% to 60% by weight of pigment component, based on the overall weight of the suspension.

The proportion of pigment component in the suspension is preferably in the range from 5% to 60% by weight and more preferably in the range from 5% to 50% by weight.

The pigment component may comprise one or more pigments.

The pigment component (A1) is based on one or more pigments.

It will be appreciated that mixtures of two or more pigments can also be used.

Organic or inorganic pigment or pigments may be included. It will be appreciated that the pigment component may also comprise mixtures of various organic or various inorganic pigments or mixtures of organic and inorganic pigments.

The pigments are present in finely divided form. Accordingly, their median particle size is typically in the range from 0.01 to 5 μm.

The inorganic pigments used can be chromatic, black and white pigments (color pigments) and also luster pigments. Typical organic pigments are chromatic and black pigments.

Examples of suitable organic pigments are:

monoazo pigments: C.I. Pigment Brown 25;
- C.I. Pigment Orange 5, 13, 36, 38, 64 and 67;
- C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247 and 251;
- C.I. Pigment Yellow 1, 3, 62, 65, 73, 74, 97, 120, 151, 154, 168, 181, 183 and 191;
- C.I. Pigment Violet 32;

disazo pigments: C.I. Pigment Orange 16, 34, 44 and 72;

C.I. Pigment Yellow 12, 13, 14, 16, 17, 81, 83, 106, 113, 126, 127, 155, 174, 176, 180 and 188;
disazo condensation pigments: C.I. Pigment Yellow 93, 95 and 128;
C.I. Pigment Red 144, 166, 214, 220, 221, 242 and 262;
C.I. Pigment Brown 23 and 41;
anthanthrone pigments: C.I. Pigment Red 168;
anthraquinone pigments: C.I. Pigment Yellow 147, 177 and 199;
C.I. Pigment Violet 31;
anthrapyrimidine pigments: C.I. Pigment Yellow 108;
quinacridone pigments: C.I. Pigment Orange 48 and 49;
C.I. Pigment Red 122, 202, 206 and 209;
C.I. Pigment Violet 19;
quinophthalone pigments: C.I. Pigment Yellow 138;
diketopyrrolopyrrole pigments: C.I. Pigment Orange 71, 73 and 81;
C.I. Pigment Red 254, 255, 264, 270 and 272;
dioxazine pigments: C.I. Pigment Violet 23 and 37;
C.I. Pigment Blue 80;
flavanthrone pigments: C.I. Pigment Yellow 24;
indanthrone pigments: C.I. Pigment Blue 60 and 64;
isoindoline pigments: C.I. Pigment Orange 61 and 69;
C.I. Pigment Red 260;
C.I. Pigment Yellow 139 and 185;
isoindolinone pigments: C.I. Pigment Yellow 109, 110 and 173;
isoviolanthrone pigments: C.I. Pigment Violet 31;
metal complex pigments: C.I. Pigment Red 257;
C.I. Pigment Yellow 117, 129, 150, 153 and 177;
C.I. Pigment Green 8;
perinone pigments: C.I. Pigment Orange 43;
C.I. Pigment Red 194;
perylene pigments: C.I. Pigment Black 31 and 32;
C.I. Pigment Red 123, 149, 178, 179, 190 and 224;
C.I. Pigment Violet 29;
phthalocyanine pigments: C.I. Pigment Blue 15, 15:1, 15:2, 15:3, 15:4, 15:6 and 16;
C.I. Pigment Green 7 and 36;
pyranthrone pigments: C.I. Pigment Orange 51;
C.I. Pigment Red 216;
pyrazoloquinazolone pigments: C.I. Pigment Orange 67;
C.I. Pigment Red 251;
thioindigo pigments: C.I. Pigment Red 88 and 181;
C.I. Pigment Violet 38;
triarylcarbonium pigments: C.I. Pigment Blue 1, 61 and 62;
C.I. Pigment Green 1;
C.I. Pigment Red 81, 81:1 and 169;
C.I. Pigment Violet 1, 2, 3 and 27;
C.I. Pigment Black 1 (aniline black);
C.I. Pigment Yellow 101 (aldazine yellow);
C.I. Pigment Brown 22.
Examples of suitable inorganic pigments are:
white pigments: titanium dioxide (C.I. Pigment White 6), zinc white, pigment grade zinc oxide; zinc sulfide, lithopone;
black pigments: iron oxide black (C.I. Pigment Black 11), iron manganese black, spinel black (C.I. Pigment Black 27); carbon black (C.I. Pigment Black 7);
chromatic pigments: chromium oxide, chromium oxide hydrate green; chrome green (C.I. Pigment Green 48); cobalt green (C.I. Pigment Green 50); ultramarine green;
cobalt blue (C.I. Pigment Blue 28 and 36; al. Pigment Blue 72); ultramarine blue; manganese blue;
ultramarine violet; cobalt violet and manganese violet;
red iron oxide (C.I. Pigment Red 101); cadmium sulfoselenide (C.I. Pigment Red 108); cerium sulfide (C.I. Pigment Red 265); molybdate red (C.I. Pigment Red 104); ultramarine red;
brown iron oxide (C.I. Pigment Brown 6 and 7), mixed brown, spinel phases and corundum phases (C.I. Pigment Brown 29, 31, 33, 34, 35, 37, 39 and 40), chromium titanium yellow (C.I. Pigment Brown 24), chrome orange;
cerium sulfide (C.I. Pigment Orange 75);
yellow iron oxide (C.I. Pigment Yellow 42); nickel titanium yellow (C.I. Pigment Yellow 53; C.I. Pigment Yellow 157, 158, 159, 160, 161, 162, 163, 164 and 189); chromium titanium yellow; spinel phases (C.I. Pigment Yellow 119); cadmium sulfide and cadmium zinc sulfide (C.I. Pigment Yellow 37 and 35); chrome yellow (C.I. Pigment Yellow 34); bismuth vanadate (C.I. Pigment Yellow 184).

Luster pigments are platelet-shaped pigments having a monophasic or polyphasic construction whose color play is marked by the interplay of interference, reflection and absorption phenomena. Examples are aluminum platelets and aluminum, iron oxide and mica platelets bearing one or more coats, especially of metal oxides.

The suspension in step (a) of the present invention's process for producing a solid pigment preparation in the form of granules further comprises 0% to 50% by weight of a first filler component (A2), based on the overall weight of the suspension. Accordingly, no first filler component (A2) need be present in the suspension. Preferably, no first filler component (A2) is present. When such a component is present, the proportion of first filler component in the suspension is preferably in the range from 0.1 to 50% by weight, more preferably in the range from 5% to 50% by weight and especially in the range from 10% to 40% by weight. The range from 0.1 to 40% by weight is similarly preferred. Preference is further given to the range from 0% to 50% by weight and more preferably to the range from 0% to 40% by weight.

The first filler component may comprise one or more different fillers. Preferably, colorless or white fillers are concerned.

These colorless or white fillers generally have a refractive index ≤1.7. For example, the refractive index is 1.55 for chalk, 1.64 for barite, 1.56 for kaolin, 1.57 for talc, 1.58 for mica and 1.55 for silicates.

The fillers are usually insoluble in the application medium and are selected in particular from the following chemical classes (not only products of natural origin but also products of synthetic origin being recited by way of example):
oxides and hydroxides:
natural: aluminum oxide and magnesium oxide;
synthetic: aluminum hydroxide and magnesium hydroxide;
silicon dioxide and silicates:
natural: quartz, christobalite, kieselguhr, talc, kaolin, diatomaceous earth, mica, wollastonite and feldspar;
synthetic: fumed silica, precipitated silica, aluminosilicates and calcined aluminosilicates;
carbonates:
natural: carbonates of calcium and of magnesium, such as calcite, chalk, dolomite and magnesite;
synthetic: precipitated calcium carbonate;
sulfates:
natural: sulfates of barium and of calcium, such as barite and gypsum;
synthetic: precipitated barium sulfate.

The fillers of component (A2) may have a wide variety of particulate shapes. The particles may be spheres, cubes, platelets or fibers for example. Natural-based fillers typically have particle sizes in the range from about 1 to 300 µm. For example, commercial products based on natural chalk have a $d_{50}$ value which is generally in the range from 1 to 160 µm. Particle sizes below 1 µm are generally only present in the case of fillers produced synthetically, in particular by precipitation.

Preferred fillers of component (A2) are carbonates and sulfates, and natural and precipitated chalk and also barium sulfate are particularly preferred. These products are commercially available, for example as Omyacarb® and Omyalite® (from Omya) and Blanc fixe (from Sachtleben). Further preferred fillers are natural silicates such as kaolin, talcum under the name of Finntalc® (from Mondo Minerals Oy).

The suspension in step (a) of the present invention's process for producing a solid pigment preparation in the form of granules further comprises 10% to 70% by weight of a surface-active additive component (A3), based on the sum total of the weights of components (A1) and (A2), The proportion of surface-active additive component (A3) in the suspension is preferably in the range from 15% to 70% by weight.

The additive component may comprise one or more additives.

Useful additives are in particular nonionic and/or anionic water-soluble surface-active additives. The choice of additive type is especially dependent on the choice of pigment and also the desired color.

Particularly suitable nonionic additives are based on polyethers (additives (A3.1)).

As well as the unmixed polyalkylene oxides, preferably $C_2$-$C_4$-alkylene oxides and phenyl-substituted $C_2$-$C_4$-alkylene oxides, especially polyethylene oxides, polypropylene oxides and poly(phenylethylene oxide)s, it is in particular block copolymers, especially polymers having polypropylene oxide and polyethylene oxide blocks or poly(phenylethylene oxide) and polyethylene oxide blocks, and also random copolymers of these alkylene oxides which are suitable.

These polyalkylene oxides are obtainable by polyaddition of alkylene oxides onto starter molecules such as saturated or unsaturated aliphatic and aromatic alcohols, saturated or unsaturated aliphatic and aromatic amines, saturated or unsaturated aliphatic carboxylic acids and carboxamides and also aromatic carboxamides and sulfonamides. Aromatic starter molecules may be substituted by $C_1$-$C_{20}$-alkyl or $C_7$-$C_{30}$-aralkyl. It is customary to use from 1 to 300 mol and preferably from 3 to 150 mol of alkylene oxide per mole of starter molecule, although in the case of aromatic starter molecules the amounts of alkylene oxide are in particular in the range from 2 to 100 mol, preferably in the range from 5 to 50 mol and especially in the range from 10 to 30 mol. The polyaddition products may have a terminal OH group or be end group capped, being in the form of $C_1$-$C_6$-alkyl ethers for example.

Suitable aliphatic alcohols comprise in general from 6 to 26 carbon atoms and preferably from 8 to 18 carbon atoms and can have an unbranched, branched or cyclic structure. Examples are octanol, nonanol, decanol, isodecanol, undecanol, dodecanol, 2-butyloctanol, tridecanol, isotridecanol, tetradecanol, pentadecanol, hexadecanol (cetyl alcohol), 2-hexyldecanol, heptadecanol, octadecanol (stearyl alcohol), 2-heptyl-undecanol, 2-octyldecanol, 2-nonyltridecanol, 2-decyltetradecanol, oleyl alcohol and 9-octadecenol and also mixtures of these alcohols, such as $C_8$/$C_{10}$, $C_{13}$/$C_{15}$ and $C_{16}$/$C_{18}$ alcohols, and cyclopentanol and cyclohexanol. Of particular interest are the saturated and unsaturated fatty alcohols obtained from natural raw materials by lipolysis and reduction and the synthetic fatty alcohols from the oxo process. The alkylene oxide adducts with these alcohols typically have average molecular weights $M_n$ from 200 to 5000.

Examples of the abovementioned aromatic alcohols include not only unsubstituted phenol and α- and β-naphthol but also the alkyl-substituted products, which are substituted in particular by $C_1$-$C_{12}$-alkyl, preferably $C_4$-$C_{12}$-alkyl or $C_1$-$C_4$-alkyl, and the aralkyl-substituted products, in particular $C_7$-$C_{30}$-aralkyl-substituted phenol, such as hexylphenol, heptylphenol, octylphenol, nonylphenol, isononylphenol, undecylphenol, dodecylphenol, di- and tributylphenol and dinonylphenol, and also bisphenol A and its reaction products with styrene, in particular bisphenol A substituted by a total of 4 phenyl-1-ethyl radicals in the ortho positions to the two OH groups.

Suitable aliphatic amines correspond to the abovementioned aliphatic alcohols. Again of particular importance here are the saturated and unsaturated fatty amines which preferably have from 14 to 20 carbon atoms. Examples of aromatic amines are aniline and its derivatives.

Useful aliphatic carboxylic acids include especially saturated and unsaturated fatty acids which preferably comprise from 14 to 20 carbon atoms and fully hydrogenated, partially hydrogenated and unhydrogenated resin acids and also polyfunctional carboxylic acids, for example dicarboxylic acids, such as maleic acid.

Suitable carboxamides are derived from these carboxylic acids.

As well as alkylene oxide adducts with monofunctional amines and alcohols it is alkylene oxide adducts with at least bifunctional amines and alcohols which are of very particular interest.

The at least bifunctional amines preferably have from 2 to 5 amine groups and conform in particular to the formula $H_2N$—$(R^1$—$NR^2)_n$—$H(R^1$: $C_2$-$C_6$-alkylene; $R^2$: hydrogen or $C_1$-$C_6$-alkyl; n: 1-5). Specific examples are: ethylenediamine, diethylenetriamine, triethylene-tetramine, tetraethylenepentamine, 1,3-propylenediamine, dipropylenetriamine, 3-amino-1-ethyleneaminopropane, hexamethylenediamine, dihexamethylenetriamine, 1,6-bis(3-aminopropylamino) hexane and N-methyldipropylenetriamine, of which hexamethylenediamine and diethylenetriamine are more preferable and ethylenediamine is most preferable.

These amines are preferably reacted first with propylene oxide and then with ethylene oxide. The ethylene oxide content of the block copolymers is typically about 10% to 90% by weight.

The average molecular weights $M_n$ of the block copolymers based on polyfunctional amines are generally in the range from 1000 to 40000 and preferably in the range from 1500 to 30000.

The at least bifunctional alcohols preferably have from two to five hydroxyl groups. Examples are $C_2$-$C_6$-alkylene glycols and the corresponding di- and polyalkylene glycols, such as ethylene glycol, 1,2-propylene glycol, 1,3-propylene glycol, 1,2-butylene glycol, 1,4-butylene glycol, 1,6-hexylene glycol, dipropylene glycol and polyethylene glycol, glycerol and pentaerythritol, of which ethylene glycol and polyethylene glycol are more preferable and propylene glycol and dipropylene glycol are most preferable.

Particularly preferred alkylene oxide adducts with at least bifunctional alcohols have a central polypropylene oxide block, i.e. are based on a propylene glycol or polypropylene glycol which is initially reacted with further propylene oxide and then with ethylene oxide. The ethylene oxide content of the block copolymers is typically in the range from 10% to 90% by weight.

The average molecular weights $M_n$ of the block copolymers based on polyhydric alcohols are generally in the range from 1000 to 20000 and preferably in the range from 1000 to 15000.

Such nonionic surface-active additives are known and commercially available for example under the names of Tetronic®, Pluronic® and Pluriol® (BASF), Atlas®, Symperonic, (Uniquema), Emulgator WN and 386 (Lanxess) and also Rhodasurf, Soprophor® (Rhodia), Genopol (Clariant), Dowfax (Dow), Berol, Duomeen, Ethomeen (Akzo), Ethylan, (Akcros).

Examples of the water-soluble anionic surface-active agents which are particularly useful as component (A3) are additives based on polymers of ethylenically unsaturated carboxylic acids (A3.2), additives based on polyurethanes (A3.3), additives based on acidic phosphoric, phosphonic, sulfuric and/or sulfonic esters of the abovementioned polyethers (A3.4) and additives based on polycondensation products of aromatic sulfonic acids and formaldehyde (A3.5).

It will be appreciated that it is also possible to use mixtures of a plurality of additives (A3), i.e., not only mixtures of various nonionic additives but also mixtures of various anionic additives and also mixtures of nonionic and anionic additives.

Useful water-soluble anionic surface-active additives based on polymers of unsaturated carboxylic acids (A3.2) are particularly additives from the group of the homo- and copolymers of ethylenically unsaturated monocarboxylic acids and/or ethylenically unsaturated dicarboxylic acids, which may each further comprise interpolymerized vinyl monomers comprising no acid function, the alkoxylation products of these homo- and copolymers and the salts of these homo- and copolymers and their alkoxylation products.

As examples of carboxyl-containing monomers and of vinyl monomers there may be mentioned:
  acrylic acid, methacrylic acid and crotonic acid;
  maleic acid, maleic anhydride, maleic monoesters, maleic monoamides, reaction products of maleic acid with diamines, which may be oxidized to form derivatives comprising amine oxide groups, and fumaric acid, of which maleic acid, maleic anhydride and maleic monoamides are preferred;
  vinylaromatics, such as styrene, methylstyrene and vinyltoluene; ethylene, propylene, isobutene, diisobutene and butadiene; vinyl ethers, such as polyethylene glycol monovinyl ether;
  vinyl esters of linear or branched monocarboxylic acids, such as vinyl acetate and vinyl propionate; alkyl esters and aryl esters of ethylenically unsaturated monocarboxylic acids, in particular acrylic and methacrylic esters, such as methyl acrylate, ethyl acrylate, propyl acrylate, isopropyl acrylate, butyl acrylate, pentyl acrylate, hexyl acrylate, 2-ethylhexyl acrylate, nonyl acrylate, lauryl acrylate, hydroxyethyl acrylate, methyl methacrylate, ethyl methacrylate, propyl methacrylate, isopropyl methacrylate, butyl methacrylate, pentyl methacrylate, hexyl methacrylate, 2-ethylhexyl methacrylate, nonyl methacrylate, lauryl methacrylate and hydroxyethyl methacrylate and also phenyl acrylate, phenyl methacrylate, naphthyl acrylate, naphthyl methacrylate, benzyl acrylate and benzyl methacrylate;
  dialkyl esters of ethylenically unsaturated dicarboxylic acids, such as dimethyl maleate, diethyl maleate, dipropyl maleate, diisopropyl maleate, dibutyl maleate, dipentyl maleate, dihexyl maleate, di-2-ethylhexyl maleate, dinonyl maleate, dilauryl maleate, di-2-hydroxyethyl maleate, dimethyl fumarate, diethyl fumarate, dipropyl fumarate, diisopropyl fumarate, dibutyl fumarate, dipentyl fumarate, dihexyl fumarate, di-2-ethylhexyl fumarate, dinonyl fumarate, dilauryl fumarate, di-2-hydroxyethyl fumarate; vinylpyrrolidone; acrylonitrile and methacrylonitrile; of which styrene, isobutene, diisobutene, acrylic esters and polyethylene glycol monovinyl ether are preferred.

Polyacrylic acids in particular are to be mentioned as examples of preferred homo-polymers of these monomers.

The copolymers of the monomers mentioned may be constructed of two or more and in particular three different monomers. The copolymers may be random, alternating, block or graft. Preferred copolymers are styrene-acrylic acid, acrylic acid-maleic acid, acrylic acid-methacrylic acid, butadiene-acrylic acid, isobutene-maleic acid, diisobutene-maleic acid and styrene-maleic acid copolymers, which may each comprise acrylic esters and/or maleic esters as additional monomeric constituents.

Preferably, the carboxyl groups of nonalkoxylated homo- and copolymers are wholly or partly present in salt form in order that solubility in water may be ensured. The alkali metal salts, such as sodium and potassium salts, and the ammonium salts are suitable for example.

The nonalkoxylated polymeric additives (A3.2) will typically have average molecular weights $M_w$ in the range from 900 to 250000. The molecular weight ranges particularly suitable for the individual polymers depend on their composition, of course. The molecular weight data which follow for various polymers are given by way of example: polyacrylic acids: $M_w$ from 900 to 250000; styrene-acrylic acid copolymers: $M_w$ from 1000 to 50000; acrylic acid-methacrylic acid copolymers: $M_w$ from 1000 to 250000; acrylic acid-maleic acid copolymers: $M_w$ from 2000 to 70000.

As well as these homo- and copolymers themselves, their alkoxylation products are also of particular interest for use as additives (A3.2).

These alkoxylation products are in particular polymers formed by partial to (if possible) complete esterification with polyether alcohols. The degree of esterification of these polymers is generally in the range from 30 to 80 mol %.

Useful polyether alcohols for the esterification are in particular alcohols such as ethanol, propanol, isopropanol, butanol, fatty alcohols, the polyether alcohols themselves, preferably polyethylene glycols and polypropylene glycols, and also their unilaterally end-capped derivatives, in particular the corresponding monoethers, such as monoaryl ethers, for example monophenyl ethers, and in particular mono-$C_1$-$C_{26}$-alkyl ethers, for example ethylene and propylene glycols etherified with fatty alcohols, and the polyetheramines which are preparable for example by conversion of a terminal OH group of the corresponding polyether alcohols or by polyaddition of alkylene oxides onto preferably primary aliphatic amines. Preference here is given to polyethylene glycols, polyethylene glycol monoethers and polyetheramines. The average molecular weights $M_n$ of the polyether alcohols used and of their derivatives are typically in the range from 200 to 10000.

Specific surface-active properties can be achieved for the additives (A3.2) by varying the ratio of polar to apolar groups.

These anionic surface-active additives (A3.2) are likewise known and commercially available, for example under the names Sokalan® (BASF), Joncryl® (Johnson Polymer), Alcosperse® (Alco), Geropon® (Rhodia), Good-Rite®

(Goodrich), Neoresin® (Avecia), Orotan® and Morez® (Rohm & Haas), Disperbyk® (Byk) and also Tegospers® (Degussa).

Useful anionic surface-active additives for inclusion in these pigment preparations further include polyurethane-based additives (A3.3).

For the purposes of the present invention, the term "polyurethane" shall comprehend not just the pure reaction products of polyfunctional isocyanates (A3.3a) with isocyanate-reactive hydroxyl-comprising organic compounds (A3.3b), but also these reaction products after additional functionalization through the addition of further isocyanate-reactive compounds, examples being carboxylic acids bearing primary or secondary amino groups.

These additives are notable for their low ionic conductivity and their neutral pH compared with other surface-active additives.

Useful polyfunctional isocyanates (A3.3a) for preparing the additives (A3.3) are in particular diisocyanates, but compounds having three or four isocyanate groups can be used as well. Both aromatic and aliphatic isocyanates may be used.

Examples of preferred di- and triisocyanates are: 2,4-tolylene diisocyanate (2,4-TDI), 4,4'-diphenylmethane diisocyanate (4,4'-MDI), para-xylylene diisocyanate, 1,4-diisocyanatobenzene, tetramethylxylylene diisocyanate (TMXDI), 2,4'-diphenylmethane diisocyanate (2,4'-MDI) and triisocyanatotoluene and also isophorone diisocyanate (IPDI), 2-butyl-2-ethylpentamethylene diisocyanate, tetramethylene diisocyanate, hexamethylene diisocyanate, dodecamethylene diisocyanate, 2,2-bis(4-isocyanatocyclohexyl)propane, trimethylhexane diisocyanate, 2-isocyanatopropylcyclohexyl isocyanate, 2,4,4-trimethylhexamethylene diisocyanate, 2,2,4-trimethylhexamethylene diisocyanate, 2,4'-methylenebis(cyclohexyl)diisocyanate, cis-cyclohexane 1,4-diisocyanate, trans-cyclohexane 1,4-diisocyanate and 4-methylcyclohexane 1,3-diisocyanate (H-TDI).

It will be appreciated that mixtures of isocyanates (A3.3a) may also be used. There may be mentioned by way of example: mixtures of structural isomers of 2,4-tolylene diisocyanate and triisocyanatotoluene, examples being mixtures of 80 mol % of 2,4-tolylene diisocyanate and 20 mol % of 2,6-tolylene diisocyanate; mixtures of cis- and trans-cyclohexane 1,4-diisocyanate; mixtures of 2,4- or 2,6-tolylene diisocyanate with aliphatic diisocyanates, such as hexamethylene diisocyanate and isophorone diisocyanate.

Useful isocyanate-reactive organic compounds (A3.3b) preferably include compounds having at least two isocyanate-reactive hydroxyl groups per molecule. Compounds useful as (A3.3b), however, further include compounds having only one isocyanate-reactive hydroxyl group per molecule. These monofunctionalized compounds can partly or else wholly replace the compounds which comprise at least two isocyanate-reactive hydroxyl groups per molecule, in the reaction with the polyisocyanate (A3.3a).

Examples of particularly preferred isocyanate-reactive compounds (A3.3b) having at least two isocyanate-reactive hydroxyl groups per molecule will now be recited.

They are polyetherdiols, polyesterdiols, lactone-based polyesterdiols, diols and triols of up to 12 carbon atoms, dihydroxy carboxylic acids, dihydroxy sulfonic acids, dihydroxy phosphonic acids, polycarbonatediols, polyhydroxyolefins and polysiloxanes having on average at least two hydroxyl groups per molecule.

Useful polyetherdiols (A3.3b) include for example homo- and copolymers of $C_2$-$C_4$-alkylene oxides, such as ethylene oxide, propylene oxide and butylene oxide, tetrahydrofuran, styrene oxide and/or epichlorohydrin, which are obtainable in the presence of a suitable catalyst, an example being boron trifluoride. Further useful polyetherdiols are obtainable by (co)polymerization of these compounds in the presence of a starter having at least two acidic hydrogen atoms, examples of a starter being water, ethylene glycol, thioglycol, mercaptoethanol, 1,3-propanediol, 1,4-butanediol, 1,6-hexanediol, 1,12-dodecanediol, ethylenediamine, aniline or 1,2-di-(4-hydroxyphenyl)propane.

Examples of particularly suitable polyetherdiols (A3.3b) are polyethylene glycol, polypropylene glycol, polybutylene glycol and polytetrahydrofuran and also copolymers thereof.

The molecular weight $M_n$ of the polyetherdiols is preferably in the range from 250 to 5000 and more preferably in the range from 500 to 2500.

Useful isocyanate-reactive compounds (A3.3b) further include polyesterdiols (hydroxy polyesters), which are common knowledge.

Preferred polyesterdiols (A3.3b) are the reaction products of diols with dicarboxylic acids or their reactive derivatives, examples being anhydrides or dimethyl esters.

Useful dicarboxylic acids include saturated and unsaturated aliphatic and also aromatic dicarboxylic acids which may bear additional substituents, such as halogen. Preferred aliphatic dicarboxylic acids are saturated unbranched α,ω-dicarboxylic acids comprising from 3 to 22 and in particular from 4 to 12 carbon atoms.

Examples of particularly suitable dicarboxylic acids are: succinic acid, glutaric acid, adipic acid, suberic acid, azelaic acid, sebacic acid, 1,12-dodecanedicarboxylic acid, maleic acid, maleic anhydride, fumaric acid, itaconic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, terephthalic acid, dimethyl terephthalate and dimethyl isophthalate.

Useful diols include in particular saturated and unsaturated aliphatic and cycloaliphatic diols. The aliphatic α,ω-diols which are particularly preferred are unbranched and have from 2 to 12, in particular from 2 to 8 and especially from 2 to 4 carbon atoms. Preferred cycloaliphatic diols are derived from cyclohexane.

Examples of particularly suitable diols are: ethylene glycol, propylene glycol, 1,3-propanediol, 1,4-butanediol, 2-methylpropane-1,3-diol, 1,5-pentanediol, neopentyl glycol, 1,6-hexanediol, 1,8-octanediol, 1,10-decanediol, 1,12-dodecanediol, cis-but-2-ene-1,4-diol, trans-but-2-ene-1,4-diol, 2-butyne-1,4-diol, cis-1,4-di(hydroxymethyl)-cyclohexane and trans-1,4-di(hydroxymethyl)cyclohexane.

The molecular weight $M_n$ of the polyesterdiols is preferably in the range from 300 to 5000.

Lactone-based polyesterdiols useful as an isocyanate-reactive compound (A3.3b) are based in particular on aliphatic saturated unbranched ω-hydroxy carboxylic acids having from 4 to 22 and preferably from 4 to 8 carbon atoms. It is also possible to use branched ω-hydroxy carboxylic acids wherein one or more —$CH_2$— groups in the alkylene chain are replaced by —CH($C_1$-$C_4$-alkyl)-.

Examples of preferred ω-hydroxy carboxylic acids are γ-hydroxybutyric acid and δ-hydroxyvaleric acid.

It will be appreciated that the abovementioned diols may likewise be used as isocyanate-reactive compounds (A3.3b), in which case the same preferences as above apply.

Triols, in particular triols having from 3 to 12 carbon atoms and especially triols having from 3 to 8 carbon atoms are likewise useful as isocyanate-reactive compounds (A3.3b). Trimethylolpropane is an example of a particularly suitable triol.

Dihydroxy carboxylic acids useful as isocyanate-reactive compounds (A3.3b) are in particular aliphatic saturated dihydroxy carboxylic acids which preferably comprise 4 to 14 carbon atoms. Dihydroxy carboxylic acids of the formula

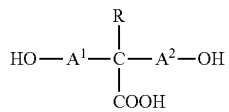

where $A^1$ and $A^2$ represent identical or different $C_1$-$C_4$-alkylene radicals and R represents hydrogen or $C_1$-$C_4$-alkyl, are very particularly suitable.

Dimethylolpropionic acid (DMPA) is a particularly preferred example of these dihydroxy carboxylic acids.

Useful isocyanate-reactive compounds (A3.3b) further include the corresponding dihydroxy sulfonic acids and dihydroxy phosphonic acids, such as 2,3-dihydroxypropanephosphonic acid.

Dihydroxy carboxylic acid as used herein shall also comprise compounds comprising more than one carboxyl function (or as the case may be anhydride or ester function). Such compounds are obtainable by reaction of dihydroxy compounds with tetracarboxylic dianhydrides, such as pyromellitic dianhydride or cyclopentanetetra-carboxylic dianhydride, in a molar ratio from 2:1 to 1.05:1 in a polyaddition reaction, and preferably have an average molecular weight $M_n$ in the range from 500 to 10000.

Examples of useful polycarbonatediols (A3.3b) are the reaction products of phosgene with an excess of diols, in particular unbranched saturated aliphatic α,ω-diols having from 2 to 12, in particular from 2 to 8 and especially from 2 to 4 carbon atoms.

Polyhydroxyolefins useful as an isocyanate-reactive compound (A3.3b) are in particular α,ω-dihydroxyolefins, and α,ω-dihydroxybutadienes are preferred.

Furthermore the polysiloxanes useful as an isocyanate-reactive compound (A3.3b) comprise on average at least two hydroxyl groups per molecule. Particularly suitable polysiloxanes comprise on average from 5 to 200 silicon atoms (number average) and are in particular substituted by $C_1$-$C_{12}$-alkyl groups, in particular methyl groups.

Examples of isocyanate-reactive compounds (A3.3b) comprising just one isocyanate-reactive hydroxyl group are in particular aliphatic, cycloaliphatic, araliphatic or aromatic monohydroxy carboxylic acids and monohydroxy sulfonic acids.

The polyurethane-based additives (A3.3) are prepared by reaction of the compounds (A3.3a) and (A3.3b) in a molar ratio of (A3.3a) to (A3.3b) which is generally in the range from 2:1 to 1:1 and preferably in the range from 1.2:1 to 1:1.2.

It is possible in this connection, as well as the aforementioned isocyanate-reactive compounds (A3.3b), to add further compounds having isocyanate-reactive groups, for example dithiols, thio alcohols, such as thioethanol, amino alcohols, such as ethanolamine and N-methylethanolamine, or diamines, such as ethylenediamine, and to thereby prepare polyurethanes which, as well as urethane groups, additionally bear isocyanurate groups, allophanate groups, urea groups, biuret groups, uretidione groups or carbodiimide groups. Further examples of such isocyanate-reactive compounds are aliphatic, cycloaliphatic, araliphatic or aromatic carboxylic acids and sulfonic acids which bear at least two primary and/or secondary amino groups.

It will be appreciated that it is also possible to add corresponding compounds having just one isocyanate-reactive group, examples being monoalcohols, primary and secondary monoamines, monoamino carboxylic and sulfonic acids and mercaptans. Customary use levels range up to 10 mol %, based on (A3.3a).

Preferably, some or all of the carboxyl groups of the reaction products (A3.3) are in salt form in order that solubility in water may be ensured. Useful salts include for example alkali metal salts, such as sodium and potassium salts, and ammonium salts.

Typically, the additives (A3.3) have average molecular weights $M_w$ in the range from 500 to 250000.

Specific surface-active properties can be achieved for the additives (A3.3) by varying the ratio of polar to apolar groups.

Such anionic surface-active additives (A3.3) are known and commercially available, for example under the name Borchi® GEN SN95 (Borchers).

Water-soluble anionic surface-active additives based on acidic phosphoric, phosphonic, sulfuric and/or sulfonic esters of polyethers (A3.4) are based in particular on the reaction products of the above-recited polyethers (A3.1) with phosphoric acid, phosphorus pentoxide and phosphonic acid on the one hand and sulfuric acid and sulfonic acid on the other. In the reaction, the polyethers are converted into the corresponding phosphoric mono- or diesters and phosphonic esters on the one hand and the sulfuric monoesters and sulfonic esters on the other. These acidic esters are preferably present in the form of water-soluble salts, in particular as alkali metal salts, especially sodium salts, and ammonium salts, but can also be used in the form of the free acids.

Preferred phosphates and phosphonates are derived especially from alkoxylated, in particular ethoxylated, fatty and oxo alcohols, alkylphenols, fatty amines, fatty acids and resin acids, and preferred sulfates and sulfonates are based in particular on alkoxylated, especially ethoxylated, fatty alcohols, alkylphenols and amines, including polyfunctional amines, such as hexamethylenediamine.

Such anionic surface-active additives (A3.4) are known and commercially available for example under the names of Nekal® (BASF), Tamol® (BASF), Crodafos® (Croda), Rhodafac® (Rhodia), Maphos® (BASF), Texapon® (Cognis), Empicol® (Albright & Wilson), Matexil® (ICI), Sprophor® (Rhodia) and Lutensit® (BASF).

Water-soluble anionic additives based on aromatic sulfonic acids and formaldehyde (A3.5) are based in particular on naphthalenesulfonic acid and are likewise preferably used in salt form, in particular as sodium salt. Their average molecular weight Mw is typically in the range from 4000 to 15000.

The additives (A3.5) are likewise known and are for example commercially available under the name of Tamol® (BASF).

In addition, the suspension may comprise further components.

These further components may comprise antioxidants for example.

Examples of suitable antioxidants include the well-known classes of the sterically hindered phenols, of the aromatic amines, of the thiosynergists, of the phosphites and phosphonites and of the sterically hindered amines.

Antioxidants based on sterically hindered phenols comprise, as an essential building block, a phenol substituted by at least one tert-butyl group ortho and in particular by a tert-butyl group in both ortho positions relative to the OH group. Most known products comprise a plurality of these building blocks, which are bonded to each other via various bridging members.

Antioxidants based on aromatic amines are mainly diarylamines, amine-ketone condensation products, for example aniline-acetone condensates, and substituted p-phenylenediamines.

Examples of thiosynergists are the metal salts of dialkyldithiocarbamic acids, zinc dialkyl dithiophosphates and esters (especially dilauryl, dimyristyl and distearyl esters) of thiodipropionic acid.

Antioxidants based on phosphites and phosphonites are typically the esters of the corresponding acids of phosphorus with alkyl-substituted, especially tert-butyl-substituted, phenols.

Antioxidants based on sterically hindered amines (HALS) comprise, as an essential building block, a 2,6-dialkyl-substituted, in particular a -dimethyl-substituted piperidine linked in position 4 to further piperidine building blocks via a wide range of bridging members.

Antioxidants are generally known and obtainable for example under the names of Irganox®, Irgaphos®, Chimassorb® and Irgastab® (Ciba), Topanol® (ICI), Hostanox® (Clariant) and Goodrite® (Goodyear).

When the suspension in step (a) of the process according to the present invention comprises an antioxidant, the antioxidant content will generally be in the range from 0.1% to 5% by weight, and in particular in the range from 0.1 to 2% by weight, based on the overall weight of the suspension.

Additionally, the suspension may further comprise a small amount of defoamers (0.01% to 0.2% by weight based on the overall weight of the suspension for example from Tego, Byk, Borchers) and biocides (0.01% to 0.5% by weight based on the overall weight of the suspension for example from Thor, Rohm & Haas).

The granularity of the suspension in step (a) of the present invention's process for producing a solid pigment preparation in the form of granules is preferably in the range from 0.01 µm to 10 µm and more preferably in the range from 0.01 to 5 µm. The particle size is preferably determined with the aid of a grindometer by laser diffraction (Malvern, Cilas).

The granularity of the suspension can generally be tuned by reference to prior art methods.

Typically, the first step is for the pigment component (A1) to be introduced into a solvent component, which may be solvent component (A0) and preferably is water, and for some or all of additive (A3) and if appropriate further components to be added to the suspension. Thereafter, this suspension is subjected to a wet-comminuting operation and the first filler component is added to the suspension before or after the wet-comminution operation and the suspension is then subjected to spray drying, if appropriate after addition of the remaining amounts of additive component (A3).

The pigment component can be employed as a dry powder or in the form of a press cake.

The pigment component is preferably a finished product, i.e., the primary particle size of the pigment has already been set to the desired value for the planned application. This pigment finish is especially advisable in the case of organic pigments, since the as-synthesized crude pigment is generally not directly suitable for the planned application. In the case of inorganic pigments, examples being oxide and bismuth vanadate pigments, the primary particle size can also be set in the course of the synthesis of the pigment, so that the pigment suspensions obtained can be employed directly in the process of the present invention.

Since the finished pigment component typically reagglomerates again in the course of drying, it is subjected to wet comminution, for example grinding in a stirred ball mill, in aqueous suspension.

The wet comminution should be carried out in the presence of at least a portion of the additive comprised in the final pigment preparation; it is preferable to add the entire amount of additive prior to the wet comminution.

To achieve a very homogeneous a dispersion of the antioxidant which possibly likewise forms a constituent of the pigment preparations, it is advantageously also added prior to the wet comminution.

When a filler of the first filler component is used, it can be added before or after the wet-comminuting operation. When the filler already has the desired particle size distribution, it is preferably dispersed in the pigment suspension only after the wet comminution of the pigment component. This holds in particular for fillers of low hardness, such as chalk, which would suffer unwanted co-comminution during pigment grinding. Conversely, a requisite comminution of too coarse-particled filler can advantageously be combined with pigment comminution.

The hereinbelow more particularly described drying in step (b) generates coarse-particled granules having average particle sizes >50 µm.

Spray granulation is preferably carried out in a spray tower using a one-material nozzle. Here, the suspension is sprayed in the form of relatively large drops, and most of the solvent evaporates, thus leading to the formation of substantially spherical granules having a particularly smooth surface (BET values generally ≤15 m$^2$/g, and especially ≤10 m$^2$/g).

The gas inlet temperature in the spray tower is generally in the range from 130 to 300° C. and preferably in the range from 150 to 300° C. The gas outlet temperature is generally in the range from 60 to 150° C. and preferably in the range from 70 to 130° C.

The residual moisture content of the granular pigment obtained is preferably <5% by weight.

Step (b) of the present invention's process for producing a solid pigment preparation in the form of granules comprises contacting the droplets formed in step (a) with a gas stream having a given temperature in order that a drying operation may yield granules having a predetermined residual moisture content.

In this respect, therefore, step (b) of the present invention's process for producing a solid pigment preparation in the form of granules corresponds to a conventional spray-drying operation.

According to the present invention, however, the droplets are at least partly exposed to an aerosol comprising a solid second filler component in step (b) before the residual moisture content is attained. Preferably, the aerosol is introduced such that the droplets are fully exposed.

This can be achieved for example by providing in the atomizing apparatus a further inlet via which the aerosol can be introduced into the atomizing apparatus.

This is typically done in the upper region of the atomizing apparatus.

The metering of the 2nd filler component is done for example by means of a screw for solid materials, air being used to form an aerosol which is introduced into the atomizing apparatus at a certain pressure, for example in the range from 1 to 10 bar, and preferably in the range from 2 to 6 bar. The metering of the 2nd filler component is done as a function of the metering of the pigment suspension into the atomizing apparatus.

The dosage of the 2nd filler component is preferably in the range from 0.01 to 2% by weight, more preferably in the range from 0.01% to 1.0% by weight and even more preferably in the range from 0.01% to 0.5% by weight based on the granules obtained.

The temperature of the gas stream at the contacting in step (b) is preferably in the range from 70° C. to 250° C.

Typically, the gas inlet temperatures on entry into the atomizing apparatus are somewhat higher. The temperatures preferably amount to the ranges stated above.

The resulting residual moisture content for the granules can be varied by adapting the temperature of the gas stream and also the flow rate to the desired residual moisture content.

The residual moisture content of the granules is typically not more than 5% by weight, based on the overall weight of the granules.

The solid second filler component is preferably a loose white powder in the form of aggregates of primary particles <50 nm.

The solid second filler component may comprise one or more solids and may in particular also comprise such solids as chosen for the first solid component. Preferably, however, the first and second solid components differ.

In addition, the second solid filler component may also be identical in its composition to the first solid filler component.

Suitable fillers for the second solid filler component can be selected from the exemplary fillers recited for the first filler component.

Preferably, the second solid filler component in the aerosol comprises at least one of the solids selected from the group consisting of silica, alumina, titania, zirconia and barium sulfate.

More preferably, the second solid filler component comprises silica.

The silica may comprise hydrophobicized silicas or hydrophilic precipitated or fumed silicas.

Precipitated silicas are typically obtained by reaction of waterglass with sulfuric acid.

Fumed silicas are typically obtained by reaction of silicon tetrachloride with water by elimination of hydrogen chloride gases.

Producers of silicas are for example Degussa AG (Sipernat®, Ultrasil'® and Sident®, Aerosil®, Aerodisp®, Aeroxide®, Aeroperl®), Wacker Chemie AG (HDK®), Dupont (LoVel, HiSil).

The granules obtained preferably have a median particle size in the range from 10 μm to 5000 μm. The median particle size is further preferably in the range from 20 μm to 1000 μm.

Step (c) of the process according to the present invention comprises separating the granules from the gas stream. The aerosol entrained in the gas stream is likewise separated from the granules. This can be done using separator cyclones for example.

The granules obtained via the process of the present invention have a pigment composition comprising
(A1) 5% to 90% by weight based on the overall weight of the composition of the pigment component;
(A2) 0% to 70% by weight based on the overall weight of the composition of the first filler component;
(A3) 10% to 70% by weight of the surface-active additive component based on the sum total of the weights of said components (A1) and (A2),
(A4) 0.01% to 2% by weight based on the overall weight of the composition of the solid second filler components, and
if appropriate further components,
the sum total of the weight fractions of all components, based on the overall weight, being 100% by weight.

Preferably, the components comprise the abovementioned requisite and optional components, namely (A1) to (A4), (A0), oxidizing agents, defoamers and biocides.

Preferably, the composition of the components (A1) to (A4) comprises the following proportions in the composition:
(A1) 10% to 85% by weight of the pigment component;
(A2) 0% to 70% by weight of the first filler component;
(A3) 15% to 70% by weight of the surface-active additive component; and
(A4) 0.01% to 1% by weight of the solid second filler components.

Since at least some of the filler component is not, as is customary, admixed to the suspension but is admixed to the granules by the process of the present invention in the form of an aerosol, the granules obtained differ from the prior art and have preferred properties.

The present invention accordingly further provides a solid pigment preparation in the form of granules, which is obtainable by following the process according to the present invention.

Such solid pigment preparations in the form of granules are useful for example in solids metering apparatus from Fast & Fluid Management or in solids metering apparatus as described in EP 1388365 for the coloration of finishes, colors, paints, liquid inks, coating systems such as cement, concrete, renders, joint materials, sealants, printing inks, polymeric materials, including in conjunction with color mixing systems.

EXAMPLES

Examples 1 to 3

Pigment granules are produced by a suspension of x % of finished pigment (A1), y % of filler component (A2), z % of additive (A3) in a % of water being adjusted to pH 7 by addition of 25% by weight aqueous sodium hydroxide solution, ball milled to a $d_{50}$ value of <1 μm and then spray granulated in a spray tower with a one-material nozzle (gas inlet temperature 165° C., gas outlet temperature 70° C.) with a residual moisture content of <5%. A screw for solid materials is used to add 0.02% of the second filler component (A4) based on (A1+A2) by means of an air stream.

Examples 1-3

| A0 | % | A1 | % | A2 | % | A3 | % |
|---|---|---|---|---|---|---|---|
| Water | 50 | P.Y. 74 | 40 | talc | 0 | * | 10 |
| Water | 50 | P.V. 23 | 5 | talc | 35 | * | 10 |
| Water | 50 | P.O. 67 | 40 | talc | 0 | * | 10 |

* Propylene oxide-ethylene oxide block polymer with central polypropylene block, an ethylene oxide content of 50% and an average molecular weight M of 6500.

Comparative Example 1

Like Example 1 without (A4).

Comparative Example 2

0.02% by weight of Aerosil 200 based on (A1+A2+A3) is added to the ground suspension which is spray granulated.

Comparative Example 3

1.0% by weight of Aerosil 200 based on (A1+A2+A3) is added to the ground suspension which is spray granulated.

The color strength of the pigment granules is determined colorimetrically in a white reduction (reported in terms of the DIN 55986 coloring equivalents CEs) in a waterborne emulsion paint. To this end, a mixture of in each case 1.25 g of pigment granules and 50 g of a waterborne styrene-acrylate based test binder having a white pigment content of 16.4% by weight ($TiO_2$, Kronos 2043) (BASF test binder 00-1067) are homogenized in a 150 ml plastic cup by running a high speed stirrer at 1500 rpm for 3 min. The color obtained is then drawn down on a black and white test card using a 100 μm wire-wound film applicator and dried for 30 min.

The coloristics of Comparative Examples 1-3 and of Example 1 are identical. The low amounts of 2nd filler component have no influence on the coloristics.

Determination of Free Flow Characteristics:

Free flow characteristics are important for the use of pourable granules in metering apparatus. Free flowability is measured in test funnels, but this does not show up any free flow disruptions due to bridging or ratholing.

Granules as per Example 1 show a somewhat shorter efflux time compared with Comparative Examples 1-3 (32 versus 37 sec) from a test funnel of 50 ml capacity and a 2 mm orifice. However, on allowing the materials to be tested to stand at room temperature for 24 h, Comparative Examples 1-3 are observed to have formed a hard layer at the surface, which no longer flows freely. This effect is not observed in Examples 1-3.

We claim:

1. A process for producing a solid pigment preparation in the form of granules comprising:

(a) atomizing a suspension comprising (A0) 30% to 90% by weight of a solvent component based on the overall weight of the suspension;

(A1) 2% to 60% by weight of a pigment component based on the overall weight of the suspension;

(A2) 0.1% to 50% by weight of a first filler component based on the overall weight of the suspension;

(A3) 10% to 70% by weight of a surface-active additive component based on a sum total of the weights of said components (A1) and (A2);

wherein the sum total of weight fractions of all components, based on the overall weight, is 100% by weight, in an atomizing apparatus, thereby obtaining droplets of liquid;

(b) at least partially exposing, before reaching a predetermined residual moisture content, the droplets of liquid obtained by the atomization to an aerosol comprising (A4) a solid second filler component and contacting the exposed droplets with a gas stream having a predetermined temperature to dry the droplets to obtain granules comprising the predetermined residual moisture content, wherein a content of the second filler is from 0.01 to 2 wt. % based on the obtained granules, and (c) separating the obtained granules from the gas stream, wherein the obtained granules have a median particle size in a range of from 10 μm to 5000 μm, and wherein the first and second filler components are different.

2. The process according to claim 1, wherein the granularity of the suspension in (a) has a value in the range from 0.01 μm to 10 μm.

3. The process according to claim 1, wherein the temperature of the gas stream during the contacting in (b) is in the range from 70° C. to 250° C.

4. The process according to claim 1, wherein the predetermined residual moisture content of the granule is not more than 5% by weight based on the overall weight of the granules.

5. The process according to claim 1, wherein the solid second filler component in the aerosol comprises at least one solid selected from the group consisting of silica, alumina, titania, zirconia, and barium sulfate.

6. The process according to claim 5, wherein the solid second filler component comprises silica.

7. The process according to claim 1, wherein the granules obtained comprise a pigment composition comprising (A1) 5% to 90% by weight based on the overall weight of the composition of the pigment component;

(A2) 0.1% to 70% by weight based on overall weight of the composition of the first filler component;

(A3) 10% to 70% by weight of the surface-active additive component based on a sum total of the weights of said components (A1) and (A2), (A4) 0.01% to 2% by weight based on overall weight of the composition of the solid second filler components; and optionally, further components, a sum total of weight fractions of all components, based on overall weight, being 100% by weight.

8. A solid pigment preparation in the form of granules obtained by the process according to claim 1.

9. The process according to claim 1, wherein the suspension of (a) comprises 0.1 to 40% by weight of (A2) the first filler component, based on the overall weight of the suspension.

10. The process according to claim 1, wherein the suspension of (a) comprises 5 to 50% by weight of (A2) the first filler component, based on the overall weight of the suspension.

11. The process according to claim 1, wherein the suspension of (a) comprises 10 to 50% by weight of (A2) the first filler component, based on the overall weight of the suspension.

12. The process according to claim 1, wherein in (b) drying the droplets to obtain granules comprising the predetermined residual moisture content is carried out before or simultaneously with applying the second filler (A4).

* * * * *